(12) United States Patent
Scheerer et al.

(10) Patent No.: US 12,459,689 B2
(45) Date of Patent: Nov. 4, 2025

(54) FILLING MACHINE AND METHOD OF OPERATING THE SAME

(71) Applicant: Elopak ASA, Spikestad (NO)

(72) Inventors: Thiemo Scheerer, Linnich (DE); Christian Pringal, Krefeld (DE)

(73) Assignee: Elopak ASA, Spikkestad (NO)

( * ) Notice: Subject to any disclaimer, the term of this patent is extended or adjusted under 35 U.S.C. 154(b) by 0 days.

(21) Appl. No.: 18/031,887

(22) PCT Filed: Oct. 19, 2021

(86) PCT No.: PCT/EP2021/078991
§ 371 (c)(1),
(2) Date: Apr. 14, 2023

(87) PCT Pub. No.: WO2022/084340
PCT Pub. Date: Apr. 28, 2022

(65) Prior Publication Data
US 2023/0399137 A1    Dec. 14, 2023

(30) Foreign Application Priority Data

Oct. 19, 2020 (EP) .................................. 20202636

(51) Int. Cl.
*B65B 43/12* (2006.01)
*B65B 3/02* (2006.01)
(Continued)

(52) U.S. Cl.
CPC ............ *B65B 43/126* (2013.01); *B65B 3/025* (2013.01); *B65B 55/04* (2013.01); *B65B 65/02* (2013.01); *B65G 54/02* (2013.01)

(58) Field of Classification Search
CPC ....... B65B 43/126; B65B 3/025; B65B 55/04; B65B 65/02; B65B 43/52; B65B 35/44;
(Continued)

(56) References Cited

U.S. PATENT DOCUMENTS 9,573,711 B2    2/2017 Nitsch
10,196,163 B2   2/2019 Baltes
(Continued)

FOREIGN PATENT DOCUMENTS

DE    102017125135 A1    5/2019
EP         0936992 B1    1/2001
WO     2019/007923 A1    1/2019

OTHER PUBLICATIONS

Search Report of Apr. 9, 2021. from European Patent Office in EP20202636.5 Filed inter alia as a statement of relevance for any non-English refs cited therein.
(Continued)

*Primary Examiner* — Veronica Martin
(74) *Attorney, Agent, or Firm* — Christian D. Abel

(57) ABSTRACT

A filling machine (100) is disclosed having a processing unit (600) including a processing station (612, 614, 616) and a conveyor system (601) configured for conveying container precursors through processing station. The conveyor system has comprising a plurality of shuttles or carriers (602) configured for carrying the container precursors along a track (604) through the processing station and a shuttle propulsion system allowing each shuttle to be individually propelled along the track. A corresponding method is also disclosed.

9 Claims, 4 Drawing Sheets

(51) Int. Cl.
*B65B 55/04* (2006.01)
*B65B 65/02* (2006.01)
*B65G 54/02* (2006.01)

(58) Field of Classification Search
CPC ......... B65B 35/46; B65B 35/24; B65B 35/54; B65G 54/02; B65G 2203/0283; B65G 35/06; B65G 17/002; B65G 21/2054; B65G 23/23; B65G 2811/0673
See application file for complete search history.

(56) References Cited

U.S. PATENT DOCUMENTS

| | | | |
|---|---|---|---|
| 2015/0191263 A1* | 7/2015 | Nitsch | B65G 29/00 |
| | | | 156/556 |
| 2017/0050332 A1* | 2/2017 | Bauer | A22C 17/0093 |
| 2020/0002040 A1* | 1/2020 | von Birgelen | B65G 23/23 |

OTHER PUBLICATIONS

ISR & Woisa dated Dec. 23, 2021. filed inter alia as a statement of relevance for any non-English refs cited therein.

* cited by examiner

FILLING MACHINE AND METHOD OF OPERATING THE SAME

TECHNICAL FIELD

The present disclosure relates generally to a filling machine for producing cellulose-based multilayer composite containers filled with a pourable foodstuff.

In particular, the present disclosure relates to a filling machine for forming cellulose-based multilayer composite container precursors and filling and sealing the container precursors to form said containers. The present disclosure also relates to a method of operating a filling machine.

BACKGROUND

Filling machines for filling packaging containers made from cellulose-based multilayer composite, e.g. a cardboard composite material, with products, in particular liquid foodstuffs, are known from the prior art. For example, reference is made to EP0936992B1 and U.S. Ser. No. 10/196,163B2 for the construction of known filling machines.

The present disclosure is directed to various apparatuses and methods that may solve or at least reduce at least one of the aforementioned problems or challenges.

SUMMARY

A filling machine according to the invention is characterised by the features of claim 1. A method according to the invention is characterised by the features of claim 7. Preferred embodiments of the filling machine and method according to the invention are characterised by the features of the dependent claims.

According to one aspect, the present disclosure provides a filling machine comprising a processing unit comprising at least one processing station and a conveyor system configured for conveying container precursors through the at least one processing station, the conveyor system comprising a plurality of shuttles or carriers configured for carrying the container precursors along a track through the at least one processing station and a shuttle propulsion system allowing each shuttle or carrier to be individually propelled along the track.

The shuttle propulsion system may comprise an electric long-stator linear motor configured for individually propelling each shuttle or carrier along the track.

Each shuttle or carrier may comprise a single holder or receptacle for carrying a container precursor or a plurality of holders or receptacles configured for carrying a plurality of container precursors through the at least one processing station in parallel.

The at least one processing station may comprise at least one of:
a bottom-sealing station configured for bottom-sealing container precursors;
a sterilizing station configured for sterilizing the container precursors;
a filling station configured for filling the container precursors with a pourable foodstuff; and
a top-sealing station configured for top-sealing the container precursors.

The filling machine may comprise a container precursor forming unit configured for forming bottom-sealed container precursors, and a transfer unit configured for transferring the bottom-sealed container precursors from the forming unit to the processing unit, the transfer unit comprising a plurality of shuttles or carriers configured for carrying the container precursors along a track from the forming unit to the processing unit and a shuttle propulsion system allowing each shuttle or carrier of the transfer unit to be individually propelled along the track The shuttle propulsion system of the transfer unit may comprise an electric long-stator linear motor configured for individually propelling each shuttle or carrier of the transfer unit along said track of the transfer unit.

According to another aspect, the present disclosure provides a method of operating a filling machine comprising a processing unit comprising at least one processing station for processing container precursors. The method comprises the step of conveying the container precursors through the least one processing station in a plurality of individually propellable shuttles or carriers traveling along a track through the processing unit.

The method may comprise the step of conveying the container precursors through a first of said at least one processing stations in a first index and conveying the container precursors through a second of said at least one processing stations in a second index being different from the first index.

The distance between adjacent shuttles or carriers may be non-constant as the shuttles or carriers travel through the processing unit. For example, the distance between adjacent shuttles or carriers may be extended when the shuttles or carriers travel through a filling station of said processing unit.

According to a further aspect, the present disclosure provides a filling machine comprising a processing unit comprising at least one processing station and a conveyor system configured for conveying container precursors through the at least one processing station, the conveyor system comprising a plurality of shuttles or carriers configured for carrying the container precursors along a track through the at least one processing station and a shuttle propulsion system allowing each shuttle or carrier to be individually propelled along the track, the filling machine comprising a container precursor forming unit configured for forming bottom-sealed container precursors, and a transfer unit configured for transferring the bottom-sealed container precursors from the forming unit to the processing unit, the transfer unit comprising a plurality of shuttles or carriers configured for carrying the container precursors along a track from the forming unit to the processing unit and a shuttle propulsion system allowing each shuttle or carrier of the transfer unit to be individually propelled along the track, wherein the transfer unit comprises a transfer station configured to receive the carton pre-cursors in single file and transfer the carton pre-cursors to the processing unit in two or more parallel processing lanes.

Above-discussed preferred and/or optional features of each aspect of the disclosure may be used, alone or in appropriate combination, in the other aspects of the invention.

DESCRIPTION OF THE DRAWINGS

Following drawings are appended to facilitate the understanding of the invention.

In the drawings, like reference numerals have been used to indicate common parts, elements or features unless otherwise explicitly stated or implicitly understood by the context.

DETAILED DESCRIPTION

In the following, embodiments of a filling machine will be described in more detail with reference to the drawings. However, it is specifically intended that the claimed invention is not limited to the embodiments and illustrations contained herein but includes modified forms of the embodiments including portions of the embodiments and combinations of elements of different embodiments as come within the scope of the following claims. It should be appreciated that in the development of any such actual implementation, as in any engineering or design project, numerous implementation, specific decisions must be made to achieve the developer's specific goals, such as compliance with system and/or business-related constraints, which may vary from one implementation of the invention to another. Moreover, it should be appreciated that such a development effort might be complex and time consuming, but would nevertheless be a routine undertaking of design, fabrication and manufacture for the skilled person having the benefit of this disclosure.

Figure 1:
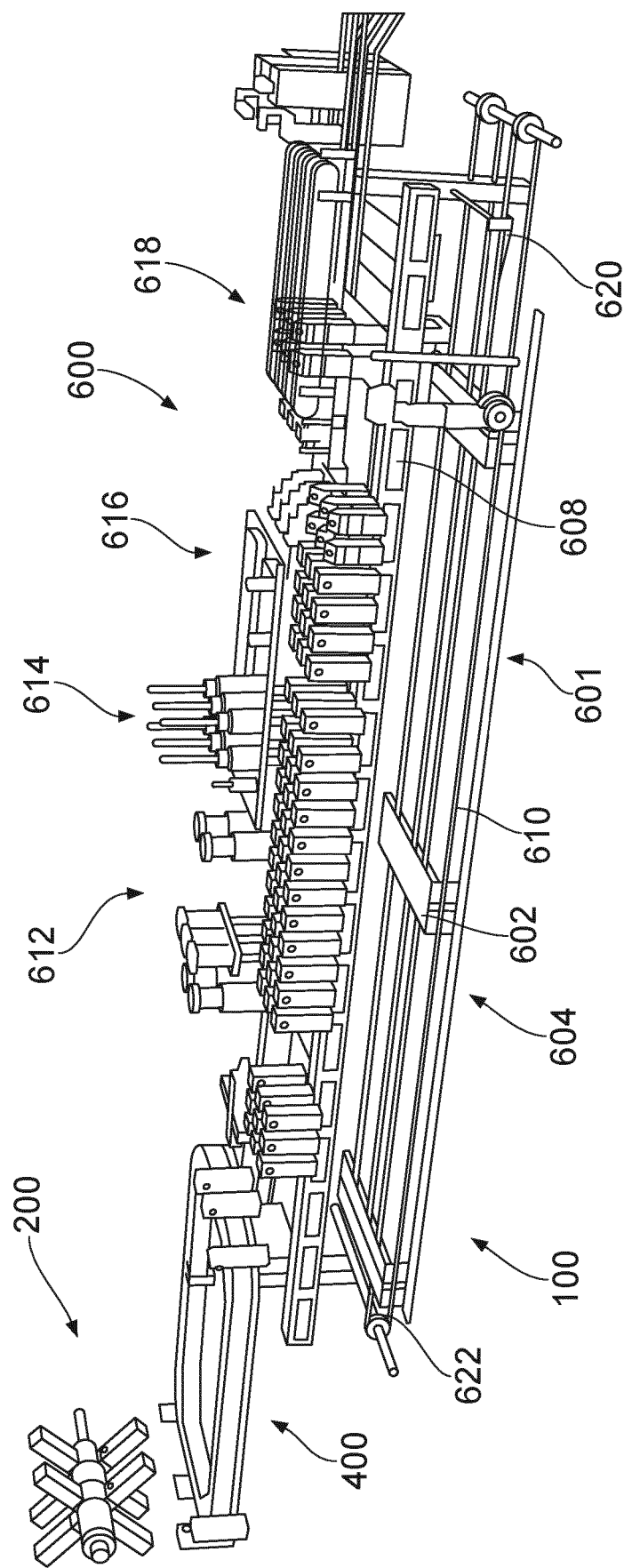
FIG. 1 is a schematic illustration of an embodiment of a filling machine.
Figure 2:
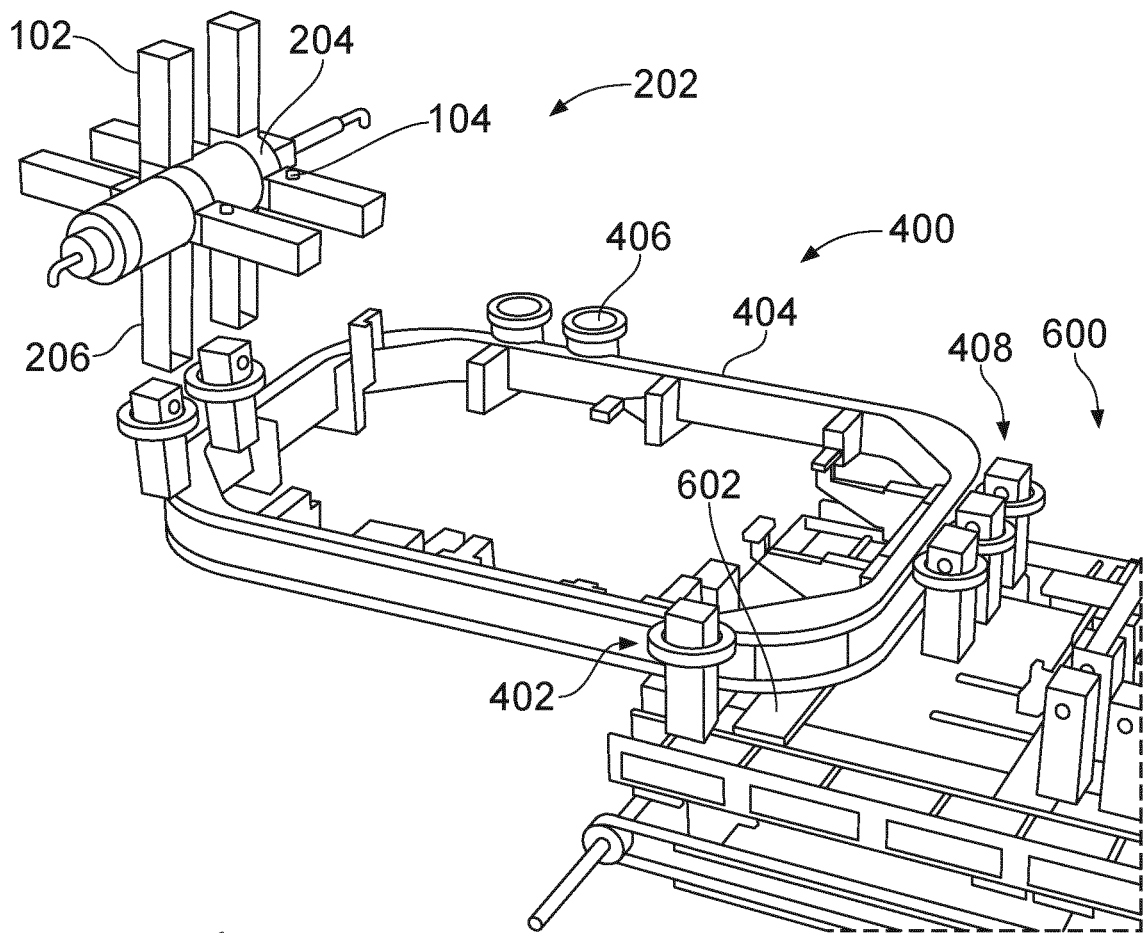
FIG. 2 is a schematic illustration of a transfer unit of the filling machine according to FIG. 1 at a first process instance.

FIG. 1 discloses a filling machine 100 comprising a forming unit 200, a transfer unit 400 and a processing unit 600. FIG. 2 discloses the forming unit 200 and the transfer unit 400 in more detail.

The forming unit 200 is configured to receive container precursors in the form of planar, folded composite jackets or sleeves from a storage unit (not disclosed). The flat-folded container precursors are raised to tubular form and bottom-sealed in a bottom-sealing station 202 of the forming unit 200. Depending on the type of container to be produced in the filling machine 100, the container precursors 102 may also be provided with an opening device 104, e.g. comprising a reclosable cap, in the forming unit 200 (see FIG. 2).

In the present embodiment, the bottom-sealing station 202 comprises transport wheels 204, which are configured to rotate stepwise and have a plurality of radially outwardly extending parallel receivers 206. The receivers 206 conventionally take the form of mandrels onto which the tubular container precursors are pushed and, subsequently, bottom-sealed. In the present embodiment, the bottom-sealing station 202 comprises two transport wheels and, consequently, is configured to bottom-seal two container precursors in parallel.

When the container precursors have been bottom-sealed, they are released from the mandrel 206 and transferred to the transfer unit 400. The transfer unit 400 comprises a plurality of shuttles or carriers 402, each being configured for receiving a bottom-sealed but open-at-top container precursor from the forming unit 200 and transporting the container precursor to the processing unit 600. In the present embodiment, each shuttle 402 is configured to receive and carry only a single container precursor and, for this purpose, comprises a single holder or receptacle 406.

In operation, the shuttles 402 travel in single file along a track 404 forming a closed loop extending between the forming unit 200 and the processing unit 600. The transfer unit 400 comprises a shuttle propulsion system allowing each shuttle 402 to be propelled along the track 404 individually, i.e. allowing each shuttle 402 to be moved along the track 404 independent of its upstream and downstream neighbour. In order to allow such propulsion, the track 404 may comprise a guide rail and an electric long-stator linear motor extending along the track 404, the guide rail being configured for carrying the shuttles 402 along the track 404 and the linear motor for individually propelling each shuttle 402 along the guide rail utilising permanent magnets. The propulsion system may for example be based on any one of the systems market under the trade names of SUPERTRAK and ACOPOSTRAK.

The processing unit 600 comprises a conveyor system 601 configured for guiding container precursors through the processing unit 600. The conveyor system 601 comprises a plurality of shuttles or carriers 602 being configured for receiving bottom-sealed but open-at-top container precursors from the transfer unit 400 and guiding them through the processing unit 600. In the embodiment shown in FIGS. 1-3, the processing unit 600 has three parallel processing lanes. Therefore, in this embodiment each shuttle 602 comprises three holders or receptacles 606 (see FIG. 3) allowing each shuttle 602 to guide three container precursors through the processing unit 600 in parallel.

At a transfer station 408 at the end of the transfer unit 400 facing the processing unit 600, shuttles 402 are configured to gather in groups of three, i.e. the number corresponding to the number of parallel processing lanes in the processing unit 600. A shuttle 602 will then move adjacent the gathered group of shuttles 402 and the container precursors will be transferred from shuttles 402 to shuttle 602. Consequently, in the present embodiment the transfer unit 400 has a two container precursor input and a three container precursor output. In other words, the transfer unit 400 is configured to receive two carton precursors in parallel and output three carton precursors in parallel.

In operation, the shuttles 602 travel in single file through the processing unit 600 along a track 604 comprising a set of substantially parallel guide rails 608 (see FIG. 1).

The guide rails 608 are configured to guide the shuttles 602 through a sterilizing station 612 configured for sterilizing the container precursors, a filling station 614 configured for filling the container precursors with a pourable foodstuff, and a top-sealing station 616 configured for top-sealing the container precursors. Such stations are, as such, well known in the art and will not be discussed further here. After the top-sealing station 616, the now completed containers are transferred from the shuttle 602 to a discharge or outfeed station 618 to be discharged from the processing unit 600 and prepared for further distribution.

When the containers have been transferred from a shuttle to the discharge station 618, the shuttle 602 is returned to the starting point of the track 604 via a return conveyor 610 to receive a new group of container precursors. In the present embodiment, the return conveyor 610 comprises a belt conveyor comprising two parallel belts configured to carry the shuttles to be returned to the starting point of the track 604. However, in principle any type of return conveyor can be used. A first elevator 620 is configured to lower the shuttles 602 from the guide rails 608 to the return conveyor 610, and a second elevator 622 is configured to raise the shuttles 602 from the return conveyor 610 to the guide rails 608.

In operation, shuttles 604 travel in single file along the track 604. Similar to the transfer unit 400, the conveyor system 601 comprises a shuttle propulsion system allowing each shuttle 602 to be propelled along the track 604 individually, i.e. without forcing the shuttle to move together with the other shuttles, thus allowing each shuttle 602 to move along the track 604 independent of its upstream and downstream neighbour. In order to allow such propulsion, an electric long-stator linear motor (not shown), may extend along at least one of the guide rails 608, which linear motor is configured to individually propel each shuttle 602 along the guide rails 608. As in the transfer unit 400, the propulsion system may for example be based on any one of the systems market under the trade names of SUPERTRAK and ACOPOSTRAK.

Figure 4:
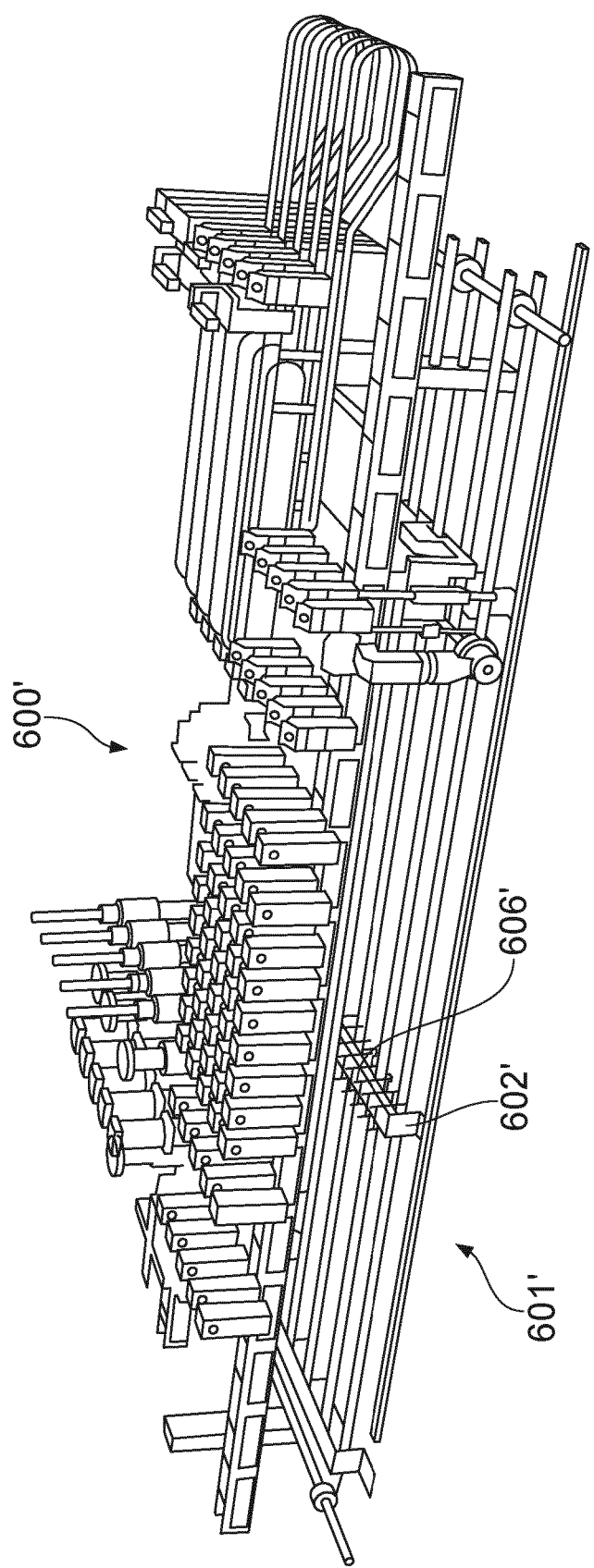
FIG. 4 is a schematic illustration of an alternative embodiment of a processing unit.

The shuttles 604 can be propelled through the processing unit 600 one by one, e.g. in single index as is disclosed in FIG. 4. Alternatively, the shuttles 604 can be configured to move through the processing unit 600 in synchronous groups, e.g. in groups of two (double index) as is disclosed in FIG. 1, groups of three (triple index) as is disclosed in FIG. 5, or in any other group size. Also, since each shuttle 604 is individually propellable along the track 604, the shuttles can be configured to move through one processing station in a first index, e.g. in synchronous groups of two (double index), and through a subsequent processing station in a second index, e.g. in synchronous groups of three (triple index). For example, the shuttles may be configured to move through the sterilizing station 612 in double index and through the filling station 614 in triple index. Further, also due to the shuttles 604 being individually propellable, the distance between adjacent shuttles can be adjusted along the track 604. For example, it may be advantageous to have a larger distance between adjacent shuttles in a filling station than in a sterilization station.

By allowing each shuttle 604 to travel independently through the processing unit 600, the dwell time in each processing station can be adopted to the most preferred dwell time of that processing station. Also, if a shuttle 604 for some reason is prevented from continued travel through the processing unit 600, downstream shuttles can continue through the processing unit 600 unhindered, thus preventing an immediate shutdown of the processing unit and providing time to resolve the situation without immediately stopping container production.

Figure 3:
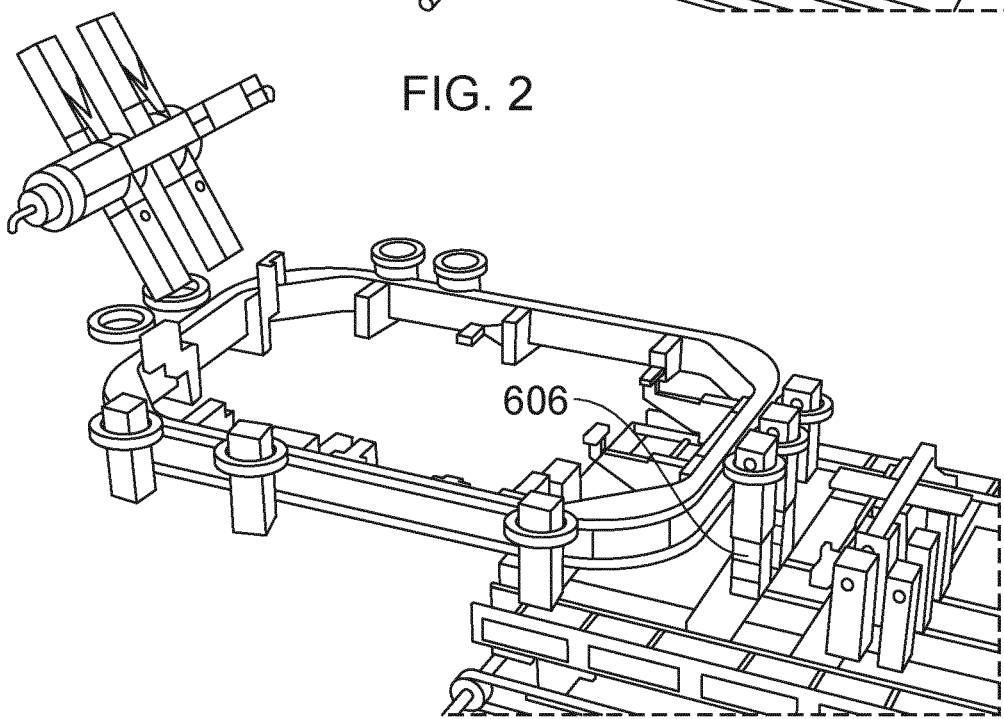
FIG. 3 is a schematic illustration of the transfer unit according to FIG. 2 at a second process instance.

In the embodiment shown in FIGS. 1-3, the processing unit 600 has three parallel processing lanes and, consequently, each shuttle 602 is provided with three holders or receptacles 606. It is understood, however, that in other embodiments the processing unit may have a different number of parallel process lanes, e.g. two, four or even only one processing lane. In such a case, the shuttles 602 may be provided with a corresponding number of parallel holders or receptacles 608 and the transfer unit 400 may be adopted to gather a corresponding number of shuttles 402 at the transfer station 408. Consequently, the disclosed conveyor system of the processing unit can easily be adopted to handle different throughput requirements and different processing station configurations.

An alternative embodiment of a processing unit 600' is shown in FIG. 4, in which case the shuttles 602' of the conveyor system 601' are provided with five parallel holders or receptacles 606' and, consequently, the processing unit 600' is provided with five processing lanes. Also, the processing unit 600' operate in single index, i.e. the shuttles 604 are propelled through the processing unit 600' one by one.

Figure 5:
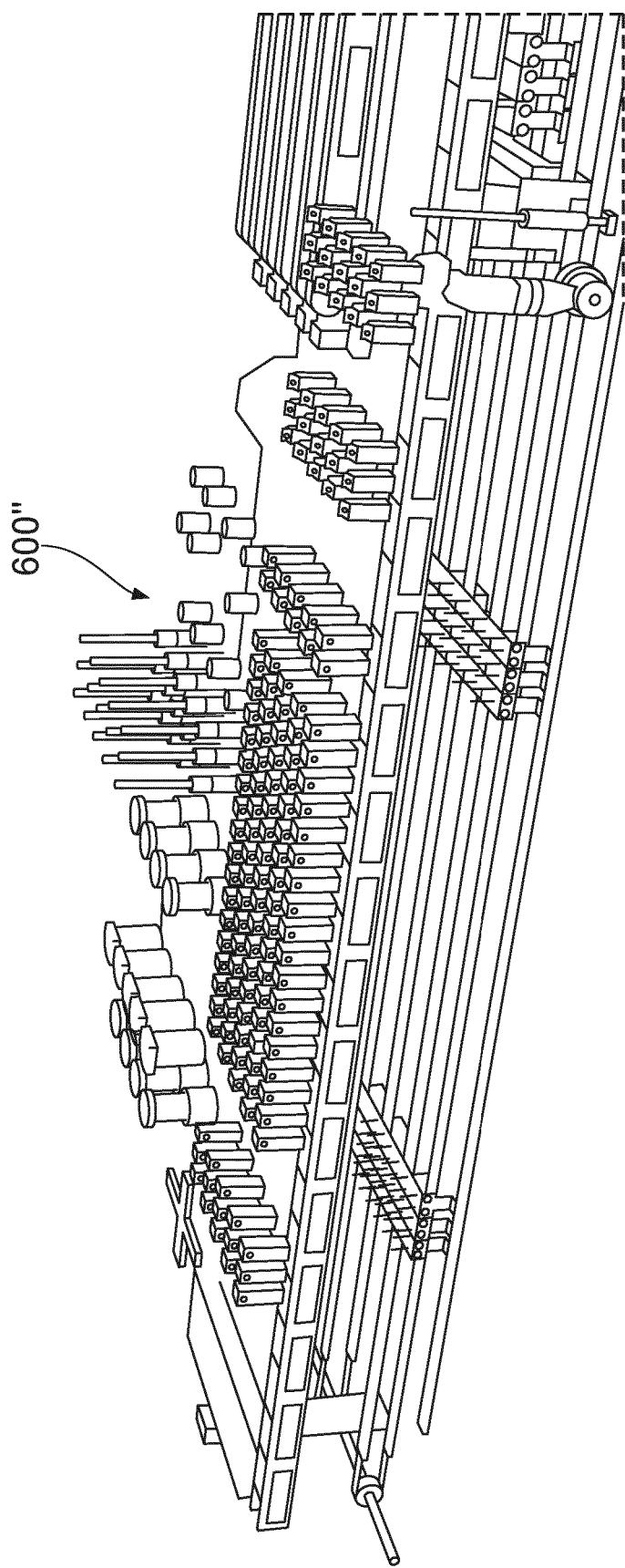
FIG. 5 is a schematic illustration of yet another alternative embodiment of a processing unit.

Yet an alternative embodiment of a processing unit 600" is shown in FIG. 5, in which case the processing unit 600" is a five lane, triple index system.

It is appreciated that certain features of the invention, which, for clarity, have been described above in the context of separate embodiments, may also be provided in combination in a single embodiment. Conversely, various features of the invention, which, for brevity, have been described in the context of a single embodiment, may also be provided separately or in any suitable sub-combination.

In particular, it will be appreciated that features described in relation to one particular embodiment may be interchangeable with features described in relation to the other embodiments. For example, . . . .

In the preceding description, various aspects of a filling machine have been described with reference to the illustrative embodiment. For purposes of explanation, specific numbers, systems and configurations were set forth in order to provide a thorough understanding of the apparatus and its workings. However, this description is not intended to be construed in a limiting sense. Various modifications and variations of the illustrative embodiment, as well as other embodiments of the apparatus, which are apparent to person skilled in the art to which the disclosed subject-matter pertains, are deemed to lie within the scope of the present invention as defined by the following claims.

The invention claimed is:

1. A filling machine comprising a processing unit comprising at least one processing station and a conveyor system configured for conveying container precursors through the at least one processing station, the conveyor system comprising a plurality of first shuttles or carriers configured for carrying the container precursors along a first track through the at least one processing station and a first shuttle propulsion system allowing each first shuttle or carrier to be individually propelled along the first track, the filling machine comprising a container precursor forming unit configured for forming bottom-sealed container precursors, and a transfer unit configured for transferring the bottom-sealed container precursors from the forming unit to the processing unit, the transfer unit comprising a plurality of second shuttles or carriers configured for carrying the container precursors along a second track from the forming unit to the processing unit and a second shuttle propulsion system allowing each second shuttle or carrier to be individually propelled along the second track, the transfer unit comprising a transfer station configured to receive the second shuttles or carriers in single file and transfer the container pre-cursors to the first shuttles or carriers in the processing unit in two or more parallel processing lanes.

2. The filling machine according to claim 1, wherein the first shuttle propulsion system comprises an electric long-stator linear motor configured for individually propelling each first shuttle or carrier along the first track.

3. The filling machine according to claim 1, wherein each first shuttle or carrier comprises a single holder or receptacle for carrying a container precursor or a plurality of holders or receptacles configured for carrying a plurality of container precursors through the at least one processing station in parallel.

4. The filling machine according to claim 1, wherein the at least one processing station comprising at least one of:
    a bottom-sealing station configured for bottom-sealing container precursors;
    a sterilizing station configured for sterilizing the container precursors:
    a filling station configured for filling the container pre-cursors with a pourable foodstuff: and a top-sealing station configured for top-sealing the container precursors.

5. The filling machine according to claim 1, wherein the second shuttle propulsion system comprises an electric long-stator linear motor configured for individually propelling each second shuttle or carrier along said second track.

6. A method of operating a filling machine comprising: a container precursor forming unit configured for forming bottom-sealed container precursors; a processing unit comprising at least one processing station for processing the container precursors; a conveyor system configured for conveying container precursors through the at least one processing station, the conveyor system comprising a plurality of first shuttles or carriers configured for carrying the container precursors along a first track through the at least one processing station and a first shuttle propulsion system allowing each first shuttle or carrier to be individually propelled along the first track; and a transfer unit configured for transferring the bottom-sealed container precursors from the forming unit to the processing unit, the transfer unit comprising a plurality of second shuttles or carriers configured for carrying the container precursors along a second track from the forming unit to the processing unit and a second shuttle propulsion system allowing each second shuttle or carrier to be individually propelled along the second track, characterised by the second shuttles or carriers being received in the transfer station in single file and the container precursors being transferred to the processing unit in two or more parallel processing lanes, and by the container precursors being conveyed through the least one processing station in the first shuttles or carriers traveling along the first track.

7. The method according to claim 6, characterised by conveying the container precursors through a first of said at least one processing stations in a first index and conveying the container precursors through a second of said at least one processing stations in a second index being different from the first index.

8. The method according to any one of claim 6 or 7, characterised by the distance between adjacent first shuttles or carriers being non-constant as the shuttles or carriers travel through the processing unit.

9. The method according to claim 8, characterised by the distance between adjacent first shuttles or carriers being extended when the shuttles or carriers travel through a filling station of said processing unit.

* * * * *